Jan. 24, 1961 G. R. LAWSON 2,969,479
ELECTRICAL CIRCUIT TESTER
Filed Aug. 27, 1959
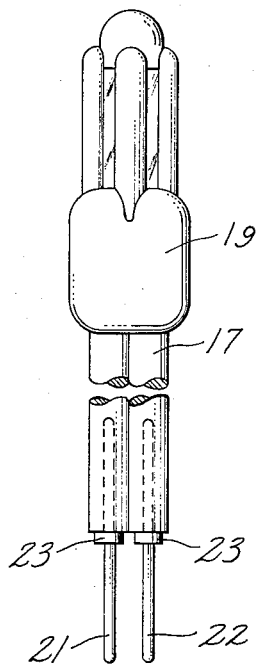
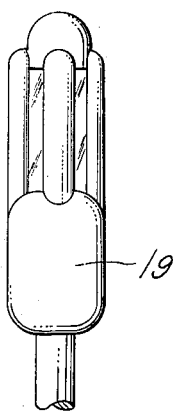
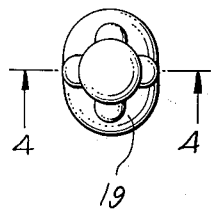
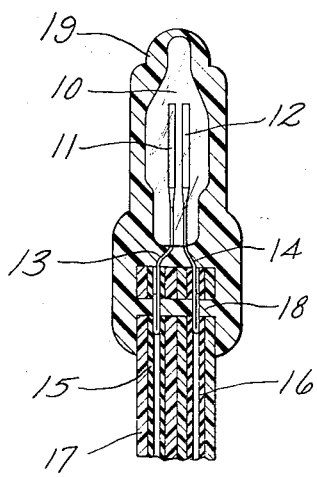
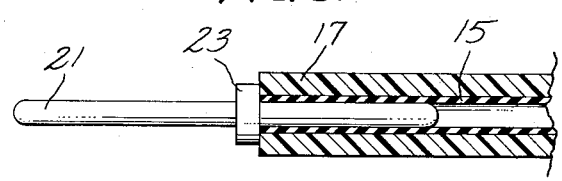
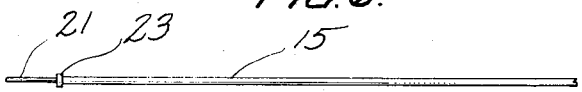
Inventor:
Gustaf R. Lawson
by Allard A. Braddock
His Attorney United States Patent Office 2,969,479
Patented Jan. 24, 1961

2,969,479
ELECTRICAL CIRCUIT TESTER

Gustaf R. Lawson, West Warwick, R.I., assignor to General Electric Company, a corporation of New York Filed Aug. 27, 1959, Ser. No. 836,379

11 Claims. (Cl. 315—52)

This invention relates to electrical circuit testers utilizing gaseous discharge tubes. These testers are of the type commonly used on voltages between 50 and 500.

A number of circuit testers available on the market consist of a small neon tube, the electrode leads of which are connected in series with a resistor to a pair of leads about six inches in length which terminate in probes which are connected into circuits undergoing test. Conventionally, the neon tube is positioned in a plastic housing from which the conductors extend.

This invention has as one of its objects the preparation of an electrical circuit tester of the general type described above which is inexpensive and easy to assemble.

Another object of the invention is to provide an electrical circuit tester in which the conductors and the resistance are combined in a single conductor-resistance element.

A further object of the invention is to provide an electrical circuit tester in which a molded protective housing for the neon tube also serves as a strain relief for the conductors-resistors.

An additional object of the invention is to provide a method for manufacturing components of an electrical circuit tester which may be very quickly and easily assembled to produce a complete tester.

The above and other objects may be effected as set forth in the following specification taken in conjunction with the attached drawing in which:

Fig. 1 is a broken view of the tester of this invention showing the two conductors extending from the neon tube housing.

Fig. 2 is a profile view of the tester illustrated in Fig. 1 with the probe tip portion of the conductors omitted.

Fig. 3 is a top plan view of the tester illustrated in Figs. 1 and 2.

Fig. 4 is a broken sectional view taken along the lines 4—4 of Fig. 3.

Fig. 5 is a view partially in section showing the method whereby the probe tip is inserted in the conductor.

Fig. 6 is a broken view of a conductor from which the insulation has been omitted with a probe tip inserted therein.

Briefly stated, in accordance with one of its aspects, the invention is directed to an electrical circuit tester comprising a gaseous discharge tube having two electrode leads extending therefrom, a short flexible high resistance conductor connected to each electrode lead, and a molded translucent protective housing positioned around the tube and the ends of the conductors which are attached to the electrode leads of the tube.

As best shown in Fig. 4, the combination of elements comprising the electrical tester of this invention includes a gaseous discharge tube 10, normally a small neon tube, having a pair of electrodes 11 and 12 which terminate in external leads 13 and 14 respectively. The leads 13 and 14 are inserted into the interiors of tubular conductors-resistors 15 and 16, respectively. Each of these conductors-resistors 15 and 16 has an exterior coating 17 of insulating material.

The tips of the conductors-resistors 15 and 16 into which the electrode leads 13 and 14 are inserted are preferably bored or punched to produce an aperture, which may extend through the diameter thereof, as illustrated in Fig. 4 at 18. These apertures serve to provide strain relief after a housing 19 has been molded around the tube 10 and tips of the conductors-resistors 15 and 16 into which the electrode leads 13 and 14 have been inserted. As best shown in Fig. 4, the molding material of the housing 19 has flowed into the aperture and thereafter the conductors-resistors 15 and 16 cannot easily be pulled away from the housing 19.

The conductors-resistors 15 and 16 normally extend about six inches from the housing 19 and at their ends opposite the housing 19 are equipped with terminal probes 21 and 22, respectively, which are inserted into the tubular portions of the conductors 15 and 16 as best shown in Fig. 5. The probes 21 and 22 are equipped with an enlarged center section 23 which serves as a stop to insure that the extending portions of the probes will all be the same length.

At the opposite extremes of electrical materials of construction are insulators, which desirably offer the greatest possible resistance to the flow of electrical current, and conductors which desirably offer the least possible resistance to the flow of electrical current. Between these extremes are resistors—elements designed to resist the flow of electrical current while yet allowing predictable proportions to pass therethrough. Resistors may be made of normally conducting materials, such as metals, which by suitable alloying have had their resistance greatly increased, or from normally insulating materials which, by the addition of finely divided conducting materials, such as carbon black or metal powders, have had their resistance to the flow of electrical current greatly reduced. The present invention preferably utilizes the latter type of conductor-resistor. Any of the conventional insulating materials, such as polyvinyl chloride, polyethylene, polyacrylates, polyurethanes, natural rubber, nylon, Dacron, vinyl acetal materials, or neoprene, butyl, silicone, or polysulfide rubbers, are satisfactory for use as a basic material of the conductors-resistors 15 and 16. During the compounding of any of these materials about 9% to 15% by weight of carbon black is added. Special "conductive" carbon blacks have been developed as additives for achieving the maximum in conductivity of the substance with which they are compounded. These carbon blacks are readily available commercially. Conductors-resistors of the type used in this invention are well known as shown by Otto Patent No. 1,577,981. The quantity of carbon black added depends upon the resistance per unit length desired in the finished conductor-resistor. For the discharge tubes used in the present invention, it is desirable that the conductors-resistors 15 and 16 have a combined resistance of about 35,000 ohms. Control of the conductor cross section, length, and carbon black proportion (normally about 12% by weight) necessary to achieve this resistance is well known to those skilled in the art and will not be described herein in detail.

The housing 19 may be composed of any translucent material such as nylon, polyvinyl chloride, polystyrene, polyethylene, etc., and is applied by conventional molding techniques.

The conductors-resistors are fabricated by conventional techniques for tubular extrusion. Of the various materials listed, polyvinyl chloride loaded with carbon black is preferred in view of its ease of fabrication. After the conductor-resistor 15 has been extruded, the outer insulating layer 17, which may be of the same material as the conductors-resistors 15 and 16 but with the carbon black omitted, also desirably of polyvinyl chloride, is extruded thereover. The conductors-resistors are then cut to length, usually about six inches, pierced at one end as at 18 to provide strain relief apertures, and the electrode leads 13 and 14 are then inserted into the tubular center portions past the apertures. The terminal probes 21 and 22 may then be inserted after which the assembly is inserted in a press in which the housing 19 is molded around the tube 10 and adjacent ends of the insulated conductors. Obviously, the sequence of manufacturing steps set forth above may be altered to some extent.

While the invention is set forth with reference to a specific embodiment thereof, it is obvious that there may be variations which fall within the true spirit of the invention. Therefore, the invention should be limited in scope only as may be necessitated by the scope of the appended claims.

What I claim as new and desire to secure by Letters Patent of the United States is:

1. An electrical circuit tester comprising a light-transmissive gaseous discharge tube containing a gas ionizable at glow discharge pressures and spaced electrode means and having two electrode leads extending therefrom, a short flexible high-resistance conductor connected to each electrode lead, and a molded translucent protective housing positioned around said tube and the ends of said conductors which are attached to the electrode leads of said tube.

2. An electrical circuit tester as claimed in claim 1 wherein the conductors have a combined resistance of about 35,000 ohms.

3. An electrical circuit tester as claimed in claim 2 wherein the conductors are normally insulating non-metallic materials which have been made conducting by the addition of conducting materials in finely divided form.

4. An electrical circuit tester as claimed in claim 3 wherein the conductors are carbon-loaded polyvinyl chloride.

5. An electrical circuit tester comprising a light-transmissive neon tube containing spaced electrode means and having two electrode leads extending therefrom, a short, flexible high-resistance tubular conductor for each electrode lead, the leads extending into the tube portions of said conductors, and a molded translucent housing positioned around said tube and the ends of said conductors which are attached to the electrode leads of said tube.

6. An electrical circuit tester as claimed in claim 5 wherein the tubular conductors are composed of normally insulating non-metallic materials which have been made conducting by the addition of conducting materials in finely divided form.

7. An electrical circuit tester as claimed in claim 6 wherein the tubular conductors are carbon-loaded polyvinyl chloride.

8. An electrical circuit tester comprising a light-transmissive neon tube containing spaced electrode means and having two electrode leads extending exteriorly thereof, a pair of high-resistance tubular conductors each of which has an aperture near an end thereof, one of said electrode leads extending through the tubular portion of each conductor and extending past the aperture therein, and a molded translucent housing positioned around said tube and the ends of said conductors which are attached to the electrode leads of said tube, the molded housing extending into the apertures in said conductors to provide a strain relief to prevent said conductors from being separated from said electrode leads.

9. An electrical circuit tester comprising a light-transmissive gaseous discharge tube containing a gas ionizable at glow discharge pressures and spaced electrode means and having two electrode leads extending therefrom, a tubular conductor composed of carbon-loaded polyvinyl chloride connected to each of said electrode leads, a layer of insulating material overlying the carbon-loaded polyvinyl chloride, a probe connected to the end of each conductor opposite the tube end, the connections to said conductors extending into the tubes thereof, and a molded translucent housing positioned around said tube and the ends of said conductors which are attached to the electrode leads of said tube.

10. An electrical circuit tester as claimed in claim 9 wherein the ends of the conductors extending into the housing have apertures into which the material of the housing extends to provide strain relief.

11. The method of manufacturing an electrical circuit tester which comprises extruding a carbon-loaded polyvinyl chloride tube, extruding an insulating layer of polyvinyl chloride over said tube, cutting said insulated tube to a plurality of short lengths, affixing probes to one end of two short lengths of said tube, connecting the other ends of said lengths of tube to the electrode leads of a light-transmissive gaseous discharge tube, and molding a protective translucent housing around said gaseous discharge tube and the ends of tubing adjacent thereto.

References Cited in the file of this patent

UNITED STATES PATENTS

| | | |
|---|---|---|
| 1,422,553 | Friederich | July 11, 1922 |
| 1,755,979 | Campos | Apr. 22, 1930 |
| 1,816,690 | Moore | July 28, 1931 |
| 1,879,159 | Foulke | Sept. 27, 1932 |
| 2,295,043 | Lompe | Sept. 8, 1942 |
| 2,890,385 | Kirka | June 9, 1959 |